(12) United States Patent
Sasaki

(10) Patent No.: US 11,227,026 B2
(45) Date of Patent: Jan. 18, 2022

(54) INFORMATION PROCESSING APPARATUS, WEB APPLICATION PROGRAM NON-TRANSITORY COMPUTER READABLE RECORDING MEDIUM THAT RECORDS, AND INFORMATION PROCESSING SYSTEM

(71) Applicant: KYOCERA DOCUMENT SOLUTIONS INC., Osaka (JP)

(72) Inventor: Hideyuki Sasaki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/571,150

(22) Filed: Sep. 15, 2019

(65) Prior Publication Data

US 2020/0097518 A1 Mar. 26, 2020

(30) Foreign Application Priority Data

Sep. 21, 2018 (JP) .............................. JP2018-176764

(51) Int. Cl.
*G06F 16/958* (2019.01)
*G06F 16/957* (2019.01)
*H04L 29/08* (2006.01)

(52) U.S. Cl.
CPC ........ *G06F 16/972* (2019.01); *G06F 16/9577* (2019.01); *H04L 67/02* (2013.01)

(58) Field of Classification Search
CPC ..... G06F 16/972; G06F 16/9577; H04L 67/02

USPC ......................................................... 709/203
See application file for complete search history.

(56) References Cited

U.S. PATENT DOCUMENTS

| 2005/0216829 | A1* | 9/2005 | Kalinichenko | ......... | H04W 4/24 715/205 |
| 2006/0230344 | A1* | 10/2006 | Jennings | ............... | G06F 16/957 715/201 |
| 2012/0226990 | A1* | 9/2012 | Nakashima | ........ | H04N 1/00482 715/738 |

FOREIGN PATENT DOCUMENTS

JP 2008139981 A 6/2008

* cited by examiner

*Primary Examiner* — David R Lazaro
*Assistant Examiner* — Zia Khurshid
(74) *Attorney, Agent, or Firm* — Li & Cai Intellectual Property (USA) Office

(57) ABSTRACT

An information processing apparatus includes a web server configured to receive a screen display HTTP request from a web browser, determine whether or not the web browser is a certain web browser on a basis of the screen display HTTP request, if the web server determines that the web browser is not the certain web browser, create first HTML data including data obtained by encoding an image to be displayed on the screen, and create a first HTTP response including the first HTML data, if the web server determines that the web browser is the certain web browser, create second HTML data including link information of the image, and create a second HTTP response including the second HTML data, and return the first HTTP response or the second HTTP response to the web browser.

4 Claims, 5 Drawing Sheets

INFORMATION PROCESSING APPARATUS, WEB APPLICATION PROGRAM NON-TRANSITORY COMPUTER READABLE RECORDING MEDIUM THAT RECORDS, AND INFORMATION PROCESSING SYSTEM

CROSS-REFERENCE TO RELATED PATENT APPLICATION

This application claims the benefit of Japanese Priority Patent Application JP 2018-176764 filed Sep. 21, 2018, the entire contents of which are incorporated herein by reference.

FIELD OF THE DISCLOSURE

The present disclosure relates to a web server that creates HTML data on a basis of a screen display HTTP request received from a web browser, and sends an HTTP response including the created HTML data to a web browser. The present disclosure further relates to a non-transitory computer readable recording medium that records a web application program executable by the web server. The present disclosure further relates to an information processing system including the web server and the web browser.

BACKGROUND OF THE DISCLOSURE

There is known an art in which a web server creates HTML data on a basis of a screen display HTTP request received from a web browser and sends an HTTP response including the created HTML data to the web browser, and the web browser displays a screen on a basis of the HTML data included in the received HTTP response.

SUMMARY OF THE DISCLOSURE

It is desirable that an art in which a web server creates HTML data on a basis of a screen display HTTP request received from a web browser and sends an HTTP response including the created HTML data to the web browser, and the web browser displays a screen on a basis of the HTML data included in the received HTTP response, will be more user friendly.

According to an embodiment of the present disclosure, there is provided an information processing apparatus, including:

a web server configured to receive a screen display HTTP request from a web browser, determine whether or not the web browser is a certain web browser on a basis of the screen display HTTP request, if the web server determines that the web browser is not the certain web browser, create first HTML data including data obtained by encoding an image to be displayed on the screen, and create a first HTTP response including the first HTML data, if the web server determines that the web browser is the certain web browser, create second HTML data including link information of the image, and create a second HTTP response including the second HTML data, and return the first HTTP response or the second HTTP response to the web browser.

According to an embodiment of the present disclosure, there is provided a non-transitory computer readable recording medium that records a web application program, the web application program causing a web server of an information processing apparatus to receive a screen display HTTP request from a web browser, determine whether or not the web browser is a certain web browser on a basis of the screen display HTTP request, if the web server determines that the web browser is not the certain web browser, create first HTML data including data obtained by encoding an image to be displayed on the screen, and create a first HTTP response including the first HTML data, if the web server determines that the web browser is the certain web browser, create second HTML data including link information of the image, and create a second HTTP response including the second HTML data, and return the first HTTP response or the second HTTP response to the web browser.

According to an embodiment of the present disclosure, there is provided an information processing system, including:

a web browser; and a web server configured to receive a screen display HTTP request from the web browser, determine whether or not the web browser is a certain web browser on a basis of the screen display HTTP request, if the web server determines that the web browser is not the certain web browser, create first HTML data including data obtained by encoding an image to be displayed on the screen, and create a first HTTP response including the first HTML data, if the web server determines that the web browser is the certain web browser, create second HTML data including link information of the image, and create a second HTTP response including the second HTML data, and return the first HTTP response or the second HTTP response to the web browser.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, embodiments of the present disclosure will be described with reference to the drawings. In the embodiments, an image forming apparatus (for example, MFP, Multifunction Peripheral) will be described as an example of an information processing apparatus. However, the information processing apparatus is not limited to an image forming apparatus.

I. FIRST EMBODIMENT

1. Hardware Configuration of Information Processing Apparatus

Figure 1:
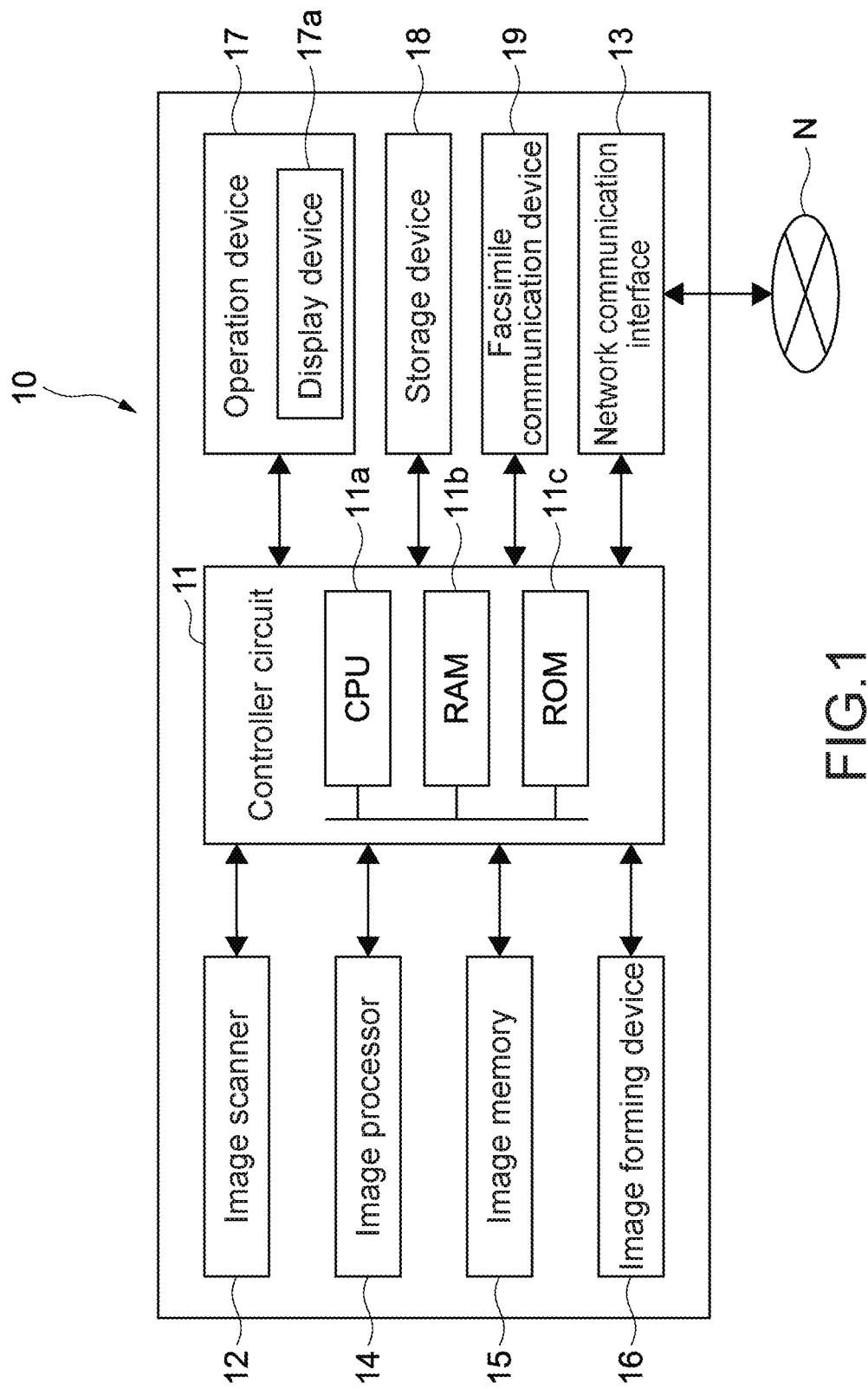
FIG. 1 shows a hardware configuration of an information processing apparatus according to a first embodiment of the present disclosure.

FIG. 1 shows a hardware configuration of an information processing apparatus according to a first embodiment of the present disclosure.

The information processing apparatus 10 includes the controller circuit 11. The controller circuit 11 includes the CPU (Central Processing Unit) 11a, the RAM (Random Access Memory) 11b, the ROM (Read Only Memory) 11c, dedicated hardware circuits, and the like and performs overall operational control of the information processing apparatus 10. The CPU 11a loads information processing programs (including web application program) stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 11 is connected to the image scanner 12, the image processor 14, the image memory 15, the image forming device 16, the operation device 17 including the display device 17a as a touch panel, the storage device 18, the facsimile communication device 19, the network communication interface 13, and the like. The controller circuit 11 performs operational control of the respective devices connected thereto and sends/receives signals and data to/from those devices.

2. Functional Configuration of Information Processing Apparatus

Figure 2:
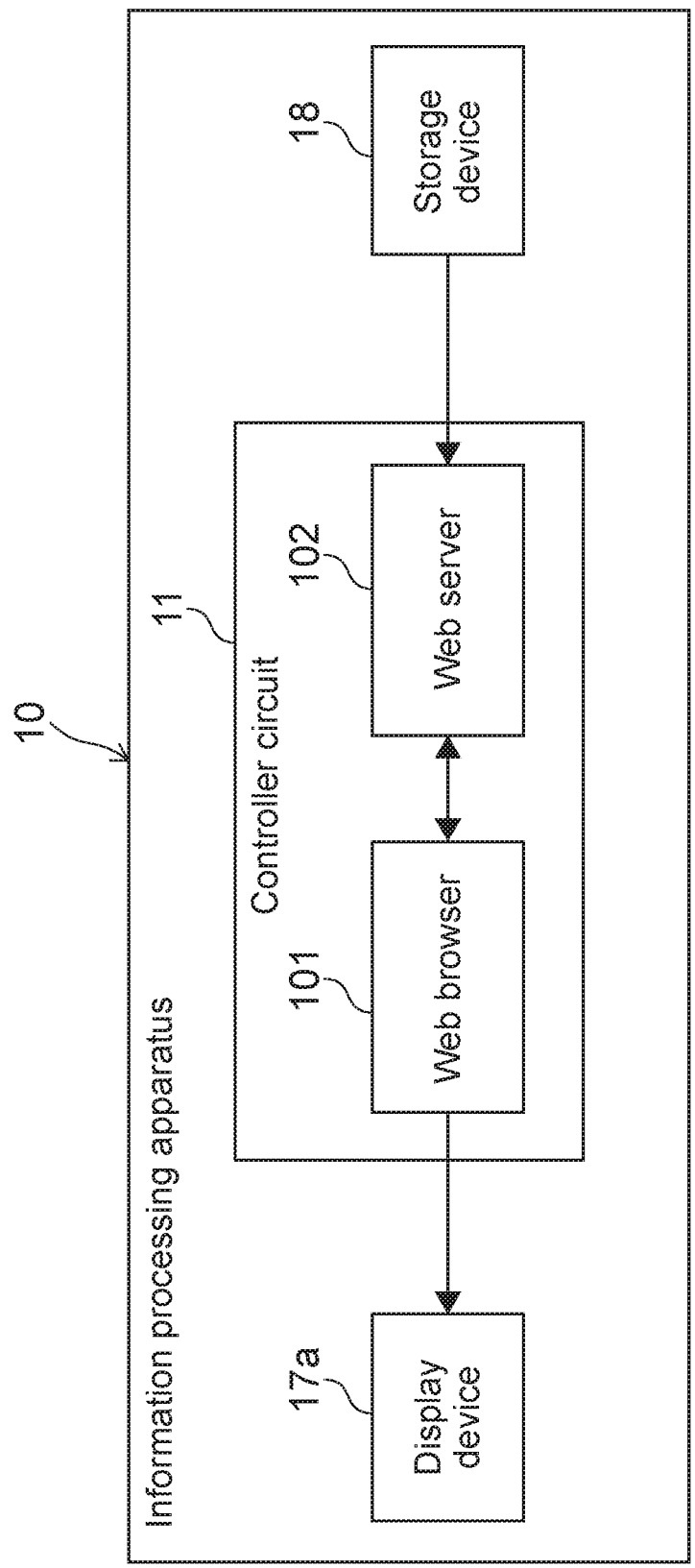
FIG. 2 shows a functional configuration of the information processing apparatus.

FIG. 2 shows a functional configuration of the information processing apparatus.

In the controller circuit 11 of the information processing apparatus 10, the CPU 11a loads a web application program stored in the ROM 11c in the RAM 11b and executes the web application program to operate as the web browser 101 and the web server 102.

The web server 102 receives a screen display HTTP request from the web browser 101, determines whether or not the web browser 101 is an old-type (certain) web browser 101 on a basis of the screen display HTTP request, if the web server determines that the web browser 101 is not the old-type web browser 101, creates first HTML data including data obtained by encoding an image to be displayed on the screen, and creates a first HTTP response including the first HTML data, if the web server determines that the web browser 101 is the old-type web browser 101, creates second HTML data including link information of the image, and creates a second HTTP response including the second HTML data, and returns the first HTTP response or the second HTTP response to the web browser 101.

The web browser 101 receives the first HTTP response from the web server 102. The web browser 101 decodes encoded image data included in the first HTML data. The web browser 101 displays a screen including the decoded image on the display device 17a.

The web browser 101 receives the second HTTP response from the web server 102. The web browser 101 sends an image data obtain HTTP request including link information included in the second HTML data (i.e., request to obtain image data identified by link information) to the web server 102. The web browser 101 receives the image data from the web server 102. The web browser 101 embeds the received image data in the second HTML data included in the second HTTP response received from the web server 102 to thereby display a screen including the image on the display device 17a.

3. Operational Flow of Information Processing Apparatus

Figure 3:
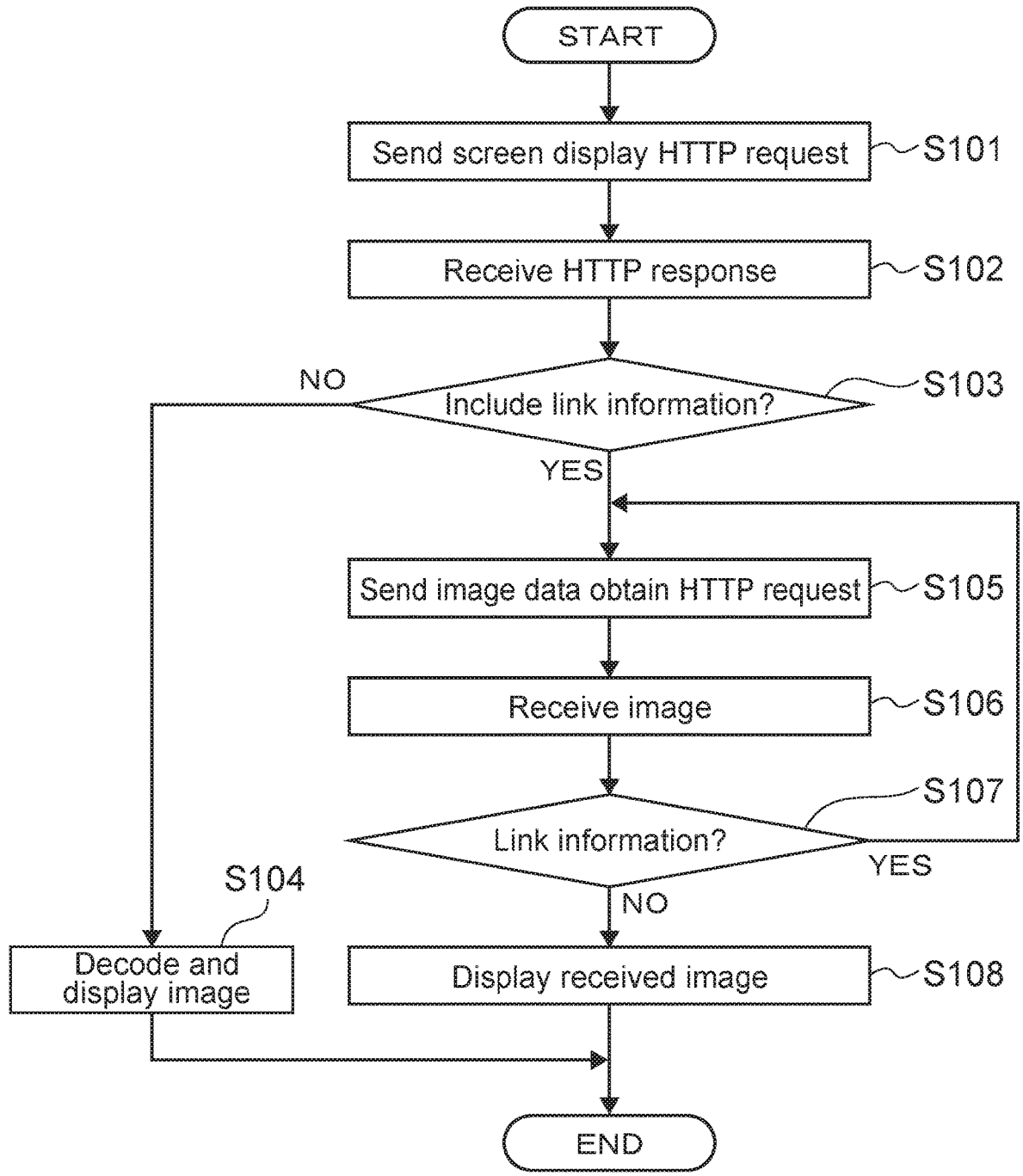
FIG. 3 shows an operational flow of the web browser.

FIG. 3 shows an operational flow of the web browser.

The web browser 101 sends the screen display HTTP request to the web server 102 (Step S101). The "screen display HTTP request" is a request to display a screen of an application realized by the web server 102 on the display device 17a.

Figure 4:
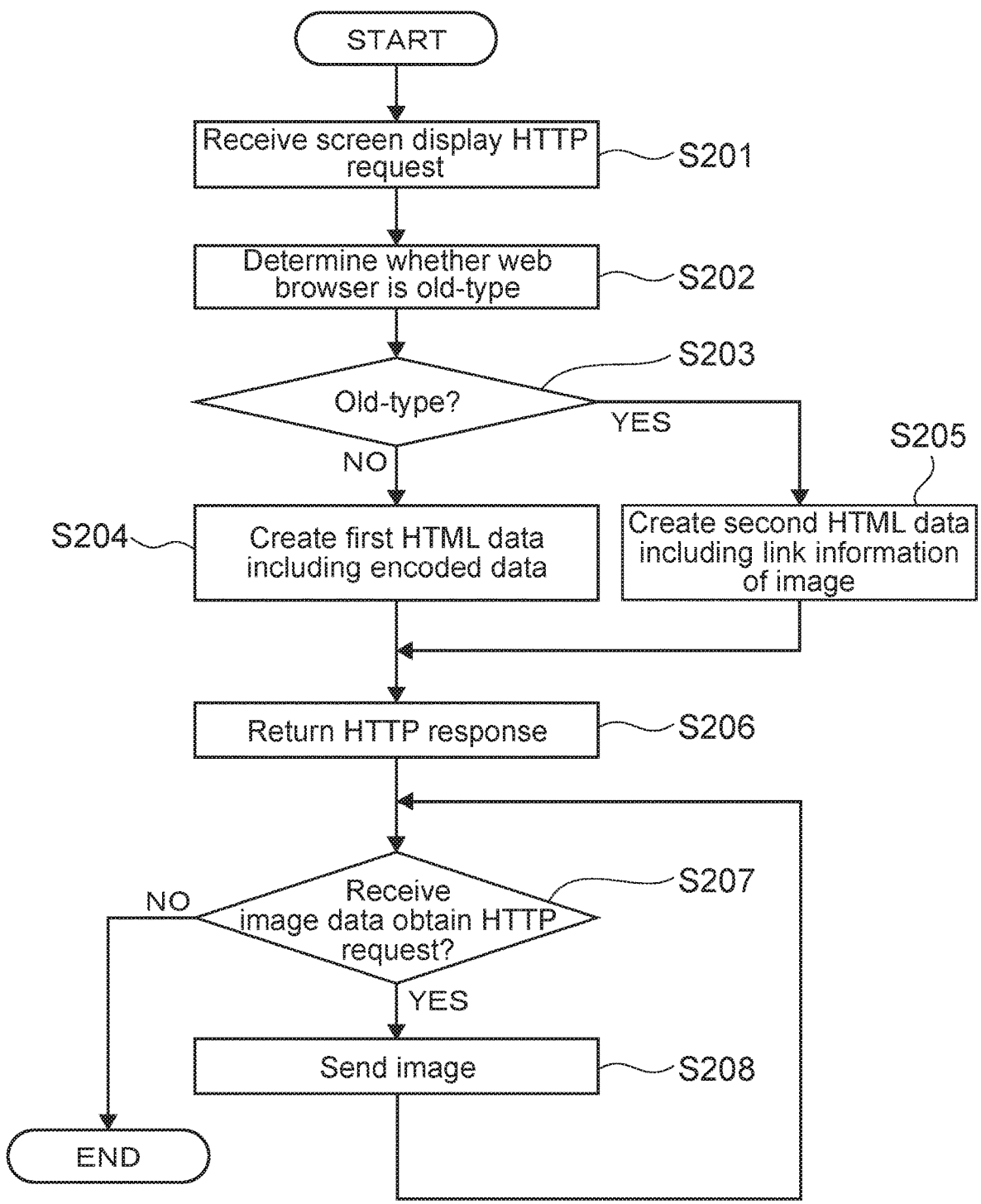
FIG. 4 shows an operational flow of the web server.

FIG. 4 shows an operational flow of the web server.

The web server 102 receives the screen display HTTP request from the web browser 101 (Step S201).

An HTTP request includes a user agent header. As a specific example, a user agent header of an image forming apparatus of a particular model is described as follows.

UserAgent: [Mozilla/5.0 (Standard; NF41SW/1.1; like Gecko; TASKalfa 8001i) NetFront/4.1]

A user agent header of an image forming apparatus of another model is described as follows.

UserAgent: [Mozilla/5.0 (Standard; NF34SW/1.1; like Gecko; TASKalfa 5500i(J)) NetFront/3.4]

The web server 102 determines whether or not the web browser 101 is an old-type (certain) web browser on a basis of the screen display HTTP request (Step S202). Specifically, the web server 102, if a certain browser name and a certain version are described in a user agent header of the screen display HTTP request, determines that the web browser 101 is the old-type web browser. In this example, the web server 102, if both "NetFront" as the browser name and "3.x" as the version are described in the user agent header of the screen display HTTP request (the latter one of the aforementioned user agent headers), determine that the web browser 101 is the old-type web browser (Step S203, YES). The web server 102, if "NetFront" as the browser name and/or "3.x" as the version are/is not described (the former one of the aforementioned user agent headers), determines that the web browser 101 is not the old-type web browser (Step S203, NO).

Hereinafter, (1) the case where the web browser 101 is not the old-type web browser (Step S203, NO) and (2) the case where the web browser 101 is the old-type web browser (Step S203, YES) will be described separately.

(1) The case where the web browser 101 is not the old-type web browser (Step S203, NO)

The web server 102 reads an image to be displayed on a screen from the storage device 18. The web server 102 creates first HTML data including data obtained by encoding (typically, BASE 64 encoding) the image to be displayed on a screen (in other words, does not include link information of image) (Step S204). The web server 102 creates a first HTTP response including a header and created first HTML data. The web server 102 returns the created first HTTP response to the web browser 101 (Step S206). The operation of the web server 102 is thus completed (Step S207, NO).

The web browser 101 receives the first HTTP response from the web server 102 (Step S102). The web browser 101 determines that the first HTML data included in the received first HTTP response does not include link information of the image (Step S103, NO). The web browser 101 decodes the encoded image data included in the first HTML data. The web browser 101 displays a screen including the decoded image on the display device 17a (Step S104).

(2) The case where the web browser 101 is the old-type web browser (step S203, YES)

The web server 102 reads link information of the image to be displayed on a screen from the storage device 18. The web server 102 creates second HTML data including the link information of the image to be displayed on the screen (Step S205). The web server 102 creates the second HTTP response including a header and the created second HTML data. The web server 102 returns the created second HTTP response to the web browser 101 (Step S206).

The web browser 101 receives the second HTTP response from the web server 102 (Step S102). The web browser 101 determines that the second HTML data included in the received second HTTP response includes the link information of the image (Step S103, YES). The web browser 101 sends an image data obtain HTTP request including the link information included in the second HTML data (i.e., request to obtain image data identified by link information) to the web server 102 (Step S105).

The web server 102 receives the image data obtain HTTP request from the web browser 101 (Step S207, YES). The web server 102 reads the image data identified by the link information included in the image data obtain HTTP request from the storage device 18. The web server 102 sends the read image data to the web browser 101 (Step S208).

The web browser 101 receives the image data from the web server 102 (Step S106). With regard to each of all the link information included in the second HTML data (Step S107, YES), the web browser 101 sends the image data obtain HTTP request to the web server 102 (Step S105), and receives the image data from the web server 102 (Step S106).

With regard to each of all the link information included in the second HTML data (Step S207, NO), the web server 102 receives the image data obtain HTTP request from the web browser 101, and sends the image data to the web browser 101.

The web browser 101 embeds all the received image data in the second HTML data included in the second HTTP response (Step S102) received from the web server 102 to thereby display a screen including the image on the display device 17*a* (Step S108).

II. SECOND EMBODIMENT

The hardware configuration and the functional configuration of the information processing apparatus 10 of the second embodiment are the same as the hardware configuration (FIG. 1) and the functional configuration (FIG. 2) of the information processing apparatus 10 of the first embodiment. The operational flow of the web browser 101 of the second embodiment is similar to the operational flow (FIG. 3) of the web browser 101 of the first embodiment. Only the operational flow of the web server 102 of the second embodiment is different from the operational flow (FIG. 4) of the web server 102 of the first embodiment. So only the operational flow of the web server 102 of the second embodiment will be described. Steps the same as the steps of the operational flow (FIG. 4) of the web server 102 of the first embodiment will be denoted by the step numbers the same as the step numbers of FIG. 4.

Figure 5:
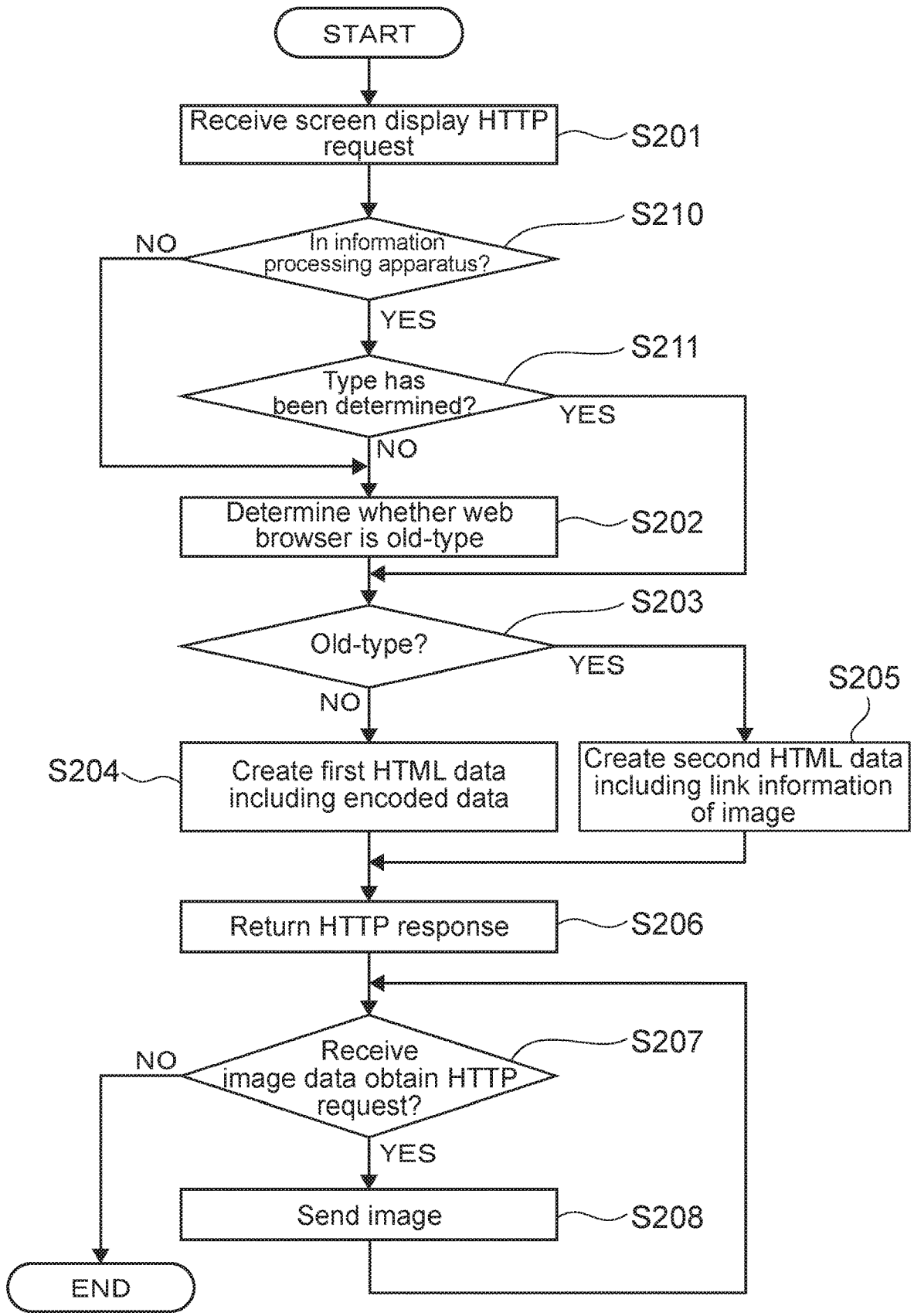
FIG. 5 shows an operational flow of a web server according to a second embodiment of the present disclosure.

FIG. 5 shows an operational flow of a web server according to a second embodiment of the present disclosure.

The web server 102 receives the screen display HTTP request from the web browser 101 (Step S201). The web server 102 determines whether or not the sender of the screen display HTTP request is the web browser 101 in the information processing apparatus 10 (Step S210). Specifically, if the IP address described in the header of the screen display HTTP request is the IP address of the information processing apparatus 10, the web server 102 determines that the sender of the screen display HTTP request is the web browser 101 in the information processing apparatus 10 (Step S210, YES).

If the sender is the web browser 101 in the information processing apparatus 10 (Step S210, YES), the web server 102 determines whether or not the web server 102 has determined whether or not the web browser 101 is the old-type web browser (Step S211). Specifically, the web server 102 determines whether or not the web server 102 has determined whether or not the web browser 101 is the old-type web browser, on a basis of a history in which the web server 102 determined whether or not the web browser 101 is the old-type web browser on a basis of the screen display HTTP request previously received. In other words, if the web server 102 previously received a screen display HTTP request from the web browser 101 in the information processing apparatus 10, then it means that the web server 102 certainly determined whether or not the web browser 101 in the information processing apparatus 10 was the old-type web browser at that time. Accordingly, if the web server 102 previously received a screen display HTTP request in the web browser 101 in the information processing apparatus 10, then it means that the web server 102 has determined whether or not the web browser 101 in the information processing apparatus 10 is the old-type web browser.

The web server 102 determines that the web server 102 has determined whether or not the web browser 101 is the old-type web browser (Step S211, YES). In this case, if the web server 102 has determined that the web browser 101 is not the old-type web browser (Step S203, NO), the web server 102 proceeds to Step S204. Meanwhile, if the web server 102 has determined that the web browser 101 is the old-type web browser (Step S203, YES), the web server 102 proceeds to Step S205. The processing after that is the same as that of the first embodiment.

Meanwhile, if the web server 102 has never received a screen display HTTP request from the web browser 101 in the information processing apparatus 10, the web server 102 determines that the web server 102 has not determined whether or not the web browser 101 is the old-type web browser (Step S211, NO). In this case, the web server 102 determines whether or not the web browser 101 is the old-type (certain) web browser on a basis of the received (Step S201) screen display HTTP request (Step S202). The processing after that is the same as that of the first embodiment.

Meanwhile, if the sender is not the web browser 101 in the information processing apparatus 10 (Step S210, NO), the web server 102 determines whether or not the web browser 101 is the old-type (certain) web browser on a basis of the received screen display HTTP request (Step S201) (Step S202). The processing after that is the same as that of the first embodiment. Note that an example of the case where "the sender is not the web browser 101 in the information processing apparatus 10" is a case where the sender is a web browser in another information processing apparatus (for example, personal computer).

III. CONCLUSION

Typically, a web browser sends a screen display HTTP request to a web server in order to display a screen on a display device. The web server creates HTML data including link information of an image to be displayed on the screen, and returns an HTTP response including the HTML data to the web browser. Typically, HTML data includes link information of each image (icon image, photograph image, etc.) to be displayed. The web browser sends an image data obtain HTTP request to the web browser and receives image data from the web browser for every link information. According to this method, the larger the amount of link information included in HTML data, the larger the number of times of sending the image data obtain HTTP request and image data. As a result, it may take long time to display the screen (low performance). The following two methods are known to improve the performance.

(1) A web server creates HTML data including data obtained by encoding (typically, BASE 64 encoding) an image to be displayed on a screen, and sends an HTTP response including the HTML data to a web browser. The web browser decodes the encoded image data included in the HTML data, and displays a screen including the decoded image.

(2) A web server creates one image, which is a combination of a plurality of images to be displayed on a screen. The web server creates HTML data including link information of the one image, and sends an HTTP response including the HTML data to a web browser. The web browser sends an image data obtain HTTP request including the link information of the one image to the web server, and receives the one image data from the web server. The web browser divides the one image data into a plurality of images. The web browser embeds all the divided image data in the HTML data, and thereby displays a screen including those images.

According to the method (1), depending on types of web browsers, some old-type web browsers may not be capable of decoding encoded image data included in HTML data, and may not be capable of displaying a screen including a decoded image.

According to the method (2), if at least part of images out of a plurality of images to be displayed on a screen is changed or a size of an image is changed, it is burdensome to newly create another image, which is a combination of a plurality of images after the change.

To the contrary, according to the present embodiment, the web server 102 determines whether or not the web browser 101 is a certain web browser 101 on a basis of the screen display HTTP request, if the web server 102 determines that the web browser 101 is not the certain web browser 101, creates first HTML data including data obtained by encoding an image to be displayed on the screen, and creates a first HTTP response including the first HTML data, if the web server 102 determines that the web browser 101 is the certain web browser 101, creates second HTML data including link information of the image, and creates a second HTTP response including the second HTML data, and returns the first HTTP response or the second HTTP response to the web browser 101.

A web application may sometimes be used by many types (i.e., types) of web browsers 101. However, according to the present embodiment, the web browser 101 is capable of reliably displaying a screen on a basis of a first HTTP response or a second HTTP response irrespective of whether or not the web browser 101 is a certain web browser. The present embodiment provides compatibility. Further, if the web browser 101 is not the certain web browser, the web server 102 creates first HTML data including data obtained by encoding an image. The number of communication is reduced, and it takes less time to display a screen (high performance).

According to the present embodiment, the web server 102, if a certain browser name and a certain version are described in a user agent header of the screen display HTTP request, determines that the web browser 101 is the certain web browser.

Accordingly, it is not necessary for the web server 102 to store information indicating whether or not the web browser 101 is the certain version for each of many models of information processing apparatus. Further, if the web server 102 receives a screen display HTTP request from the web browser 101 of a new-model information processing apparatus, the web server 102 is capable of determining whether or not the web browser 101 is the certain web browser on a basis of the user agent header of the screen display HTTP request. So even if a new-model information processing apparatus is released, there is no need to change the web application. The present embodiment provides compatibility.

According to the present embodiment, if a sender of the screen display HTTP request is a web browser 101 in the information processing apparatus 10, and if the web server 102 has determined whether or not the web browser 101 is the certain web browser 101, the web server 102 creates the first HTML data or the second HTML data depending on whether or not the web browser 101 is the certain web browser 101, that the web server 102 has determined.

Accordingly, the web server 102 does not need to determine whether or not the web browser 101 is the certain web browser on a basis of the screen display HTTP request. As a result, it takes much less time to display a screen (high performance).

It should be understood by those skilled in the art that various modifications, combinations, sub-combinations and alterations may occur depending on design requirements and other factors insofar as they are within the scope of the appended claims or the equivalents thereof

What is claimed is:

1. An information processing apparatus that includes the controller circuit with storage and display device, comprising:

a web server; and
a web browser, wherein
the web server is configured to
receive a screen display HTTP request from the web browser,
determine that the web browser is an old-type web browser, if "NetFront" as a browser name and "3.x" as a version are described in a user agent header included in the screen display HTTP request,
determine that the web browser is not the old-type web browser, if "NetFront" as the browser name and/or "3.x" as the version are/is not described in the user agent header included in the screen display HTTP request,
if the web server determines that the web browser is not the old-type web browser, create first HTML data including data obtained by encoding an image to be displayed on the screen, and create a first HTTP response including the first HTML data,
if the web server determines that the web browser is the old-type web browser, create second HTML data including link information of the image, and create a second HTTP response including the second HTML data, and
return the first HTTP response or the second HTTP response to the web browser, and wherein
the web browser is configured to
when the web browser receives the first HTTP response from the web server, decode encoded image data included in the first HTML data, and display a screen including decoded image, and when the web browser receives the second HTTP response from the web server, send an image data obtain HTTP request including link information included in the second HTML data to the web server, receive image data from the web server, and embed the image data in the second HTML data included in the second HTTP response received from the web server to thereby display a screen including the image, and if the web server determines that the web browser is not the old-type web browser, create first HTML data including data obtained by encoding the image to be displayed on the screen, and the web server creates a first HTTP response including a header and a created first HTML data, and returns the created first HTTP response to the web browser, if the web browser determines that the first HTML data included in the received first HTTP response does not include link information of the image, it decodes the encoded image data included in the first HTML data and the web browser displays a screen including the decoded image on the display device, if the web server determines that the web browser is the old-type web browser, create second HTML data including the link information of the image to be displayed on the screen, and creates the second HTTP response including a header and a created second HTML data, and returns the created second HTTP response to the web browser including the link information included in the second HTML data to the web server, the web server receives the image data obtain HTTP request from the web browser and reads the image data identified by the link information included in the image data obtain HTTP request from the storage device, the web server sends the read image data to the web browser, and the web browser embeds all the received image data in the second HTML data included in the second HTTP response received from the web server to thereby display a screen including the image on the display device and return the first HTTP response or the second HTTP response to the web browser.

2. The information processing apparatus according to claim 1, wherein the web server is configured to determine whether or not a sender of the screen display HTTP request is a web browser in the information processing apparatus, if the web server determines that the sender is the web browser in the information processing apparatus, determine whether or not the web server has determined whether or not the web browser is the old-type web browser, on a basis of a history in which the web server determined whether or not the web browser is the old-type web browser on a basis of the screen display HTTP request previously received, if the web server has determined whether or not the web browser is the old-type web browser, create the first HTML data or the second HTML data depending on whether or not the web browser is the old-type web browser, that the web server has determined, and if the web server has not determined whether or not the web browser is the old-type web browser, determine whether or not the web browser is the old-type web browser, and if the web server determines that the sender is not the web browser in the information processing apparatus, determine whether or not the web browser is the old-type web browser.

3. A non-transitory computer readable recording medium that records a web application program, the web application program causing a web server of an information processing apparatus, the information processing apparatus that includes the controller circuit with storage and display device comprising: a web server and a web browser, wherein the web server is configured to receive a screen display HTTP request from the web browser, determine that the web browser is an old-type web browser, if "NetFront" as a browser name and "3.x" as a version are described in a user agent header included in the screen display HTTP request, determine that the web browser is not the old-type web browser, if "NetFront" as the browser name and/or "3.x" as the version are/is not described in the user agent header included in the screen display HTTP request, if the web server determines that the web browser is not the old-type web browser, create first HTML data including data obtained by encoding an image to be displayed on the screen, and create a first HTTP response including the first HTML data, if the web server determines that the web browser is the old-type web browser, create second HTML data including link information of the image, and create a second HTTP response including the second HTML data, and return the first HTTP response or the second HTTP response to the web browser, and wherein the web browser is configured to when the web browser receives the first HTTP response from the web server, decode encoded image data included in the first HTML data, and display a screen including decoded image, and when the web browser receives the second HTTP response from the web server, send an image data obtain HTTP request including link information included in the second HTML data to the web server, receive image data from the web server, and embed the image data in the second HTML data included in the second HTTP response received from the web server to thereby display a screen including the image, and if the web server determines that the web browser is not the old-type web browser, create first HTML data including data obtained by encoding the image to be displayed on the screen, and the web server creates a first HTTP response including a header and a created first HTML data, and returns the created first HTTP response to the web browser, if the web browser determines that the first HTML data included in the received first HTTP response does not include link information of the image, it decodes the encoded image data included in the first HTML data, and the web browser displays a screen including the decoded image on the display device, if the web server determines that the web browser is the old-type web browser, create second HTML data including the link information of the image to be displayed on the screen, and creates the second HTTP response including a header and a created second HTML data, and returns the created second HTTP response to the web browser including the link information included in the second HTML data to the web server, the web server receives the image data obtain HTTP request from the web browser and reads the image data identified by the link information included in the image data obtain HTTP request from the storage device, the web server sends the read image data to the web browser, and the web browser embeds all the received image data in the second HTML data included in the second HTTP response received from the web server to thereby display a screen including the image on the display device and return the first HTTP response or the second HTTP response to the web browser.

4. An information processing system that includes the controller circuit with storage and display device, comprising:

a web browser; and
a web server, wherein
the web server is configured to
receive a screen display HTTP request from the web browser,
determine that the web browser is an old-type web browser, if "NetFront" as a browser name and "3.x" as a version are described in a user agent header included in the screen display HTTP request,
determine that the web browser is not the old-type web browser, if "NetFront" as the browser name and/or "3.x" as the version are/is not described in the user agent header included in the screen display HTTP request,
if the web server determines that the web browser is not the old-type web browser, create first HTML data including data obtained by encoding an image to be displayed on the screen, and create a first HTTP response including the first HTML data,
if the web server determines that the web browser is the old-type web browser, create second HTML data including link information of the image, and create a second HTTP response including the second HTML data, and
return the first HTTP response or the second HTTP response to the web browser, and wherein the web browser is configured to
when the web browser receives the first HTTP response from the web server, decode encoded image data included in the first HTML data, and display a screen including decoded image, and
when the web browser receives the second HTTP response from the web server, send an image data obtain HTTP request including link information included in the second HTML data to the web server, receive image data from the web server, and embed the image data in the second HTML data included in the second HTTP response received from the web server to thereby display a screen including the image, and
if the web server determines that the web browser is not the old-type web browser, create first HTML data including data obtained by encoding the image to be displayed on the screen, and the web server creates a first HTTP response including a header and a created first HTML data, and returns the created first HTTP response to the web browser,
if the web browser determines that the first HTML data included in the received first HTTP response does not include link information of the image, it decodes the encoded image data included in the first HTML data, and the web browser displays a screen including the decoded image on the display device,
if the web server determines that the web browser is the old-type web browser, create second HTML data including the link information of the image to be displayed on the screen, and creates the second HTTP response including a header and a created second HTML data and returns the created second HTTP response to the web browser including the link information included in the second HTML data to the web server,
the web server receives the image data obtain HTTP request from the web browser and reads the image data identified by the link information included in the image data obtain HTTP request from the storage device, the web server sends the read image data to the web browser, and
the web browser embeds all the received image data in the second HTML data included in the second HTTP response received from the web server to thereby display a screen including the image on the display device and return the first HTTP response or the second HTTP response to the web browser.

* * * * *